United States Patent
Koskinen (10) Patent No.: US 10,341,988 B2
(45) Date of Patent: Jul. 2, 2019

(54) TRANSMITTING CONTENT TO DEVICES

(71) Applicant: Nokia Solutions and Networks Oy, Espoo (FI)

(72) Inventor: Henri Markus Koskinen, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/758,819

(22) PCT Filed: Jan. 25, 2013

(86) PCT No.: PCT/EP2013/051403
§ 371 (c)(1),
(2) Date: Jul. 1, 2015

(87) PCT Pub. No.: WO2014/114343
PCT Pub. Date: Jul. 31, 2014

(65) Prior Publication Data
US 2015/0327299 A1    Nov. 12, 2015

(51) Int. Cl.
*H04W 76/00*    (2018.01)
*H04W 4/06*    (2009.01)
(Continued)

(52) U.S. Cl.
CPC .......... *H04W 72/005* (2013.01); *H04W 4/06* (2013.01); *H04W 36/0007* (2018.08);
(Continued)

(58) Field of Classification Search
CPC ... H04W 4/06; H04W 76/002; H04W 72/005; H04W 36/0033; H04W 92/20
See application file for complete search history.

(56) References Cited

U.S. PATENT DOCUMENTS

| 2007/0177592 | A1  | 8/2007 | Mooney et al. ............... 370/390 |
| 2010/0169504 | A1* | 7/2010 | Gabin ..................... H04L 65/80 709/231 |
| 2014/0185455 | A1* | 7/2014 | Balasubramanian ... H04W 4/06 370/241 |

FOREIGN PATENT DOCUMENTS

CN    101827306 A    9/2010

OTHER PUBLICATIONS

3GPP TS 24.301 V11.5.0 (Dec. 2012); 3rd Generation Partnership Project; Technical Specification Group Core Network and Terminals; Non-Access-Stratum (NAS) protocol for Evolved Packet System (EPS); Stage 3 (Release 11).
(Continued)

*Primary Examiner* — Gbemileke J Onamuti
(74) *Attorney, Agent, or Firm* — Harrington & Smith (57) ABSTRACT

Content service(s) to device(s) is provided. Availability of broadcast transmission of said content is determined after an indication is signaled that a dedicated unicast radio bearer is needed/is not needed for reception of said content. Subsequent to reception of the indication the content is transmitted over a dedicated unicast radio bearer or broadcasting. Transmission of the content can be supported by an indication of a need for a continued network connection for the device even when the amount of unicast traffic over the connection in a core network does not justify maintenance of the connection to cause the core network to refrain from releasing said network connection. Unicasting of content to a device moving from a first to a second cell can be continued based on signaling of a message to a control entity of a second cell, the message providing information of the identity of the service(s).

20 Claims, 3 Drawing Sheets

(51) Int. Cl.
    *H04W 72/00*    (2009.01)
    *H04W 76/40*    (2018.01)
    *H04W 36/00*    (2009.01)
    *H04W 92/20*    (2009.01)
(52) U.S. Cl.
    CPC ........ *H04W 76/40* (2018.02); *H04W 36/0033* (2013.01); *H04W 92/20* (2013.01)

(56) References Cited

OTHER PUBLICATIONS

3GPP TS 26.346 V11.3.0 (Dec. 2012); 3rd Generation Partnership Project; Technical Specification Group Services and System Aspects; Multimedia Broadcast/Multicast Service (MBMS); Protocols and codecs (Release 11).

3GPP TS 36.304 V11.2.0 (Dec. 2012); 3rd Generation Partnership Project; Technical Specification Group Radio Access Network; Evolved Universal Terrestrial Radio Access (E-UTRA); User Equipment (UE) procedures in idle mode (Release 11).

3GPP TS 36.331 V11.2.0 (Dec. 2012); 3rd Generation Partnership Project; Technical Specification Group Radio Access Network; Evolved Universal Terrestrial Radio Access (E-UTRA); Radio Resource Control (RRC); Protocol specification (Release 11).

3GPP TS 36.413 V11.2.0 (Dec. 2012); 3rd Generation Partnership Project; Technical Specification Group Radio Access Network; Evolved Universal Terrestrial Radio Access Network (E-UTRAN); S1 Application Protocol (S1AP) (Release 11).

3GPP TS 36.423 V11.3.0 (Dec. 2012); 3rd Generation Partnership Project; Technical Specification Group Radio Access Network; Evolved Universal Terrestrial Radio Access Network (E-UTRAN); X2 application protocol (X2AP) (Release 11).

General issues to be considered when planning SFNs; EBU Technical; Media Technology & Innovation; Mar. 13, 2009; 5 pages.

3GPP TSG-RAN WG2 Meeting #75bis, Oct. 10-14, 2011, Zhuhai, China, R2-115344, "Providing assistance information to the UE for service continuity", Alcatel-Lucent, 5 pgs.

3GPP TSG-RAN WG3 #55bis, Malta, Mar. 27-30, 2007, Tdoc R3-070561, "MBMS Service continuity when moving between SFN and non-SFN zones", Orange, 6 pgs.

* cited by examiner

TRANSMITTING CONTENT TO DEVICES

This disclosure relates to transmission of content to devices via a cellular communication system.

A communication system provides a facility that enables communication sessions between two or more entities such as fixed or mobile communication devices, base stations, servers, machine type devices, and/or other communication nodes. A communication system and compatible communicating entities typically operate in accordance with a given standard and/or specification setting out how the various entities shall operate.

In a wireless communication system at least a part of the communication between at least two devices, or stations occurs over a wireless interface. Wireless systems can be divided into cells, and hence they are often called cellular systems. Typically a cellular communication system can be divided between radio access systems and a core network. An example of wireless communication systems is an architecture standardized by the 3rd Generation Partnership Project (3GPP). This system is often referred to as the long-term evolution (LTE) of the Universal Mobile Telecommunications System (UMTS) radio-access technology. A further development of the LTE is often referred to as LTE-Advanced. The various development stages of the 3GPP LTE specifications are referred to as releases.

Communications can be provided between appropriate devices, or nodes. In a wireless system a communication device of a user can provide a transceiver station that can communicate with another communication device such as e.g. base stations of access networks and/or another user device. A communication device of a user is often referred to as user equipment (UE) or terminal. A communication device is provided with an appropriate signal receiving and transmitting arrangement for enabling communication of data and signalling with other parties. For example, a user can be provided with communication session with other parties via radio access and core networks.

Delivery of broadcast or multicast services for user devices over mobile broadband networks has been proposed. For example, the LTE Release 11 standard supports use of a part of time resources of a LTE downlink (DL) carrier as multimedia broadcast multicast service single frequency network (MBSFN) subframes for broadcasting of multimedia broadcast multicast services (MBMS). In this arrangement the participating cells are organised as a single-frequency network where the cells broadcast bit-identical content on the same time-frequency resources in a strictly synchronized manner. The single frequency network (SFN), adopted e.g. in LTE MBMS, Digital Video Broadcasting-Terrestrial (DVB-T) and Digital Video Broadcasting Handheld (DVB-H), is seen as a cost and spectrum efficient way to deliver terrestrial broadcast content.

Efficiency of SFN suffers from what is known as the SFN-boundary problem. On a given time-frequency resource, one cell in a cellular system could be configured to broadcast one SFN while its immediate geographical neighbour cell may be configured to broadcast another SFN. Interference by the neighbouring SFNs, however, may render the SFN reception in some cells near the SFN boundary impossible, or at least may reduce the quality of delivery to an unacceptable level. Although the SFN technique provides good spectral efficiency for broadcast delivery locally, because of interference avoidance of frequency reuse with quite a large factor can be difficult, especially in large scale systems. Also, adequately supporting a device located and/or moving in the border region may be problematic.

Embodiments of the invention aim to address one or several of the above issues.

It is noted that the issues are not limited to any particular communication system, standard, specification, radios and so forth, but may occur in any communication device and/or system.

In accordance with an embodiment there is provided a method for receiving content of at least one service, the method comprising determining availability of broadcast transmission of said content, and in response to the determining, signaling an indication that a dedicated unicast radio bearer is needed or is not needed for reception of said content.

In accordance with a more specific aspect, the availability is determined based on availability of control information supporting reception of the broadcast transmission. The signaling may be triggered in response to determining that a cell broadcasting on a frequency belongs to a service area of the at least one service and/or determining that a cell broadcasting on a frequency does not provide or provides sufficient control information for initiation of reception of broadcast transmission of content of the at least one service.

In accordance with another embodiment there is provided a method for transmitting content of at least one service, the method comprising receiving from a device an indication that unicasting is needed or not needed for transmission of said content, and
subsequently transmitting the content to the device over a dedicated unicast radio bearer or broadcasting.

It can be determined that said content is available for the transmission where after transmission of said content is initiated over the dedicated unicast radio bearer.

In accordance with an embodiment there is provided a method for supporting transmission of content of at least one service in a system comprising a core network and at least one access network, comprising communication of an indication of a need for a continued network connection for a device even when the amount of unicast traffic over the connection in a core network does not justify maintenance of the connection.

The communication may comprise sending said indication to a core network entity and/or receiving said indication at a core network entity. The signaling causes the core network to refrain from releasing said network connection when the amount of unicast traffic over said connection in a core network does not justify maintenance of the connection.

In accordance with an embodiment there is provided a method for continuing transmission of content to a device in a cellular system, comprising transmitting content of at least one service over a dedicated unicast radio bearer in a first cell, and signaling to a control entity of a second cell a message providing information of the identity of the at least one service.

In accordance with a yet further embodiment there is provided a method for continuing transmission of content to a device in a cellular system, comprising receiving at a control entity of a second cell a message providing information about at least one service where content is delivered via a dedicated unicast radio bearer in a first cell, and determining whether the dedicated unicast radio bearer is to be handed over to the control entity of the second cell based on the information.

Said message can further identify the radio bearer used for said communication of content and/or indicate at least one packet number for a data packet successfully delivered to the device.

In accordance with a more specific aspect a regional restriction is applied on unicasting of said content.

The unicasting may be provided at a border region of a single frequency network.

Information regarding at least one of identities of the at least one service, delivery states of the at least one service and, an address where to obtain the content for the at least one service may be signalled. Requests for unicasting may be granted or denied based on the information.

A device in an area may request for start of delivery of the content via the unicasting in response to determination that the content cannot be received in the area via broadcasting.

Frequencies of cells associated with a multimedia broadcasting multicasting services service area can be advertised. Reception of the advertisement can be used as an authorisation for a device in a cell to request for a dedicated unicast radio bearer for delivery of content of a service.

A control entity of a target cell may be provided with information of the identity of a multimedia broadcast multicast service received by a device moving from another cell and of content of the multimedia broadcast multicast service. Delivery of the content may be continued or discontinued by the control entity of the target cell depending on whether the identity is recognised by the control entity of the target cell.

A device receiving a multimedia broadcast multicast service on a single-frequency network may determine lack of sufficient control information to initiate such reception and in response thereto request for a dedicated unicast radio bearer from the radio access network.

A device receiving the content over a dedicated unicast radio bearer may monitor for broadcasting of the same content and corresponding control information, and upon detection of the broadcasting and the corresponding control information, request for a stop of the unicasting from the cell. A control apparatus of a cell serving a device receiving the content by dedicated unicasting may determine that the dedicated unicasting has become redundant, and in response thereto stop delivery of the content via the dedicated unicasting.

An apparatus for supporting content services is also provided. The apparatus comprises at least one processor, and at least one memory including computer program code, wherein the at least one memory and the computer program code are configured, with the at least one processor, to perform the herein disclosed functions. The apparatus may be provided with appropriate means, comprising hardware and/or software, to implement the various aspects.

A base station such as an eNB, a core network entity and/or a user equipment comprising the apparatus may also be provided.

A computer program comprising program code means adapted to perform the herein described methods may also be provided. In accordance with further embodiments apparatus and/or computer program product that can be embodied on a computer readable medium for providing at least one of the above methods is provided.

Various other aspects and further embodiments are also described in the following detailed description of examples embodying the invention and in the attached claims.

The invention will now be described in further detail, by way of example only, with reference to the following examples and accompanying drawings, in which.

In the following certain exemplifying embodiments are explained with reference to a wireless or mobile communication system serving mobile communication devices. Therefore, before explaining in detail the exemplifying embodiments, certain general principles of a wireless communication system, components thereof, and mobile communication devices are briefly explained with reference to FIGS. 1 and 2 to assist in understanding the technology underlying the described examples.

Figure 1:
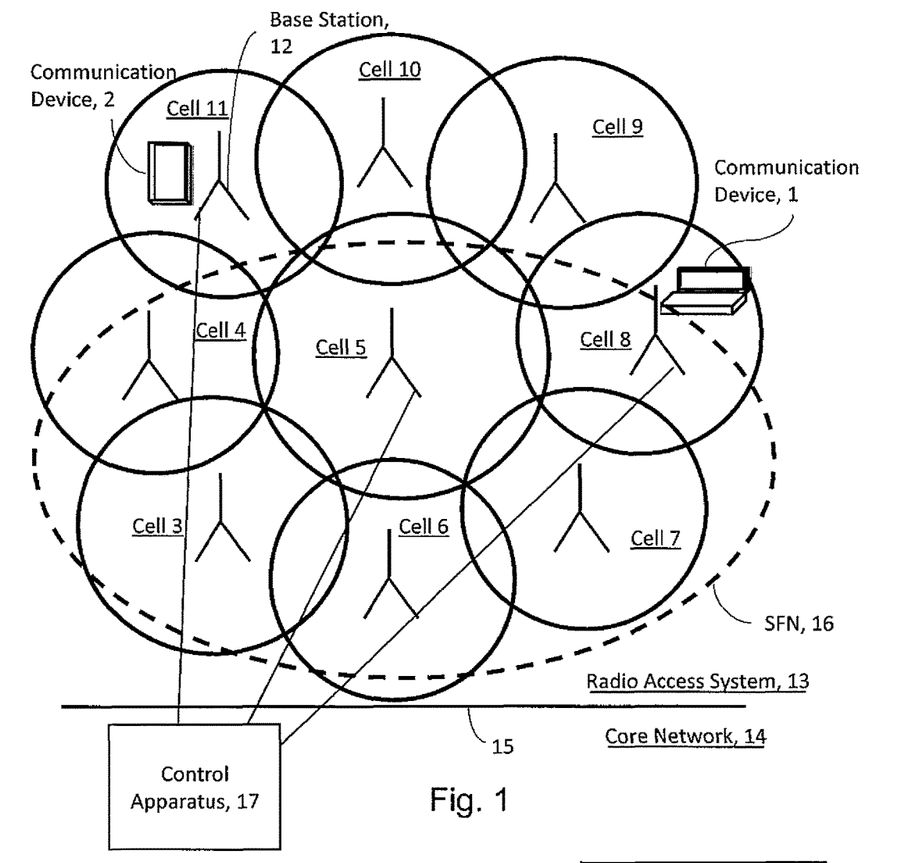
FIG. 1 shows an example of a communication system wherein below described examples of the invention may be implemented.

FIG. 1 shows schematically radio service areas or cells 3-11 of a cellular radio access system. Each of the cells 3-11 is provided by an access point, such as a base station 12, a remote radio head or similar wireless transceiver node. Since a base station provides a cell, these terms can be used interchangeably in this specification, where appropriate. A mobile communication device 1, 2 is typically provided wireless access via at least one access point/base station providing a cell. The mobile communication devices are provided with mobility, i.e. can move from a cell to the other.

It is noted that the cells are shown schematically to have circular form for illustration purposes. It is also noted that a great number of radio service areas may be provided in a cellular communication system, each cell may serve a number of mobile devices and that a mobile communication device may simultaneously be located in a plurality of cells. Also, a transceiver node site can provide more than one cell and/or a plurality of sectors, for example three radio sectors, each sector providing a cell or a sub radio service area of a cell.

In FIG. 1 example the division between the radio access system 13 and core network 14 is schematically denoted by line 15. The access system can be connected to other communication networks and a geographically wide communication system via the core network. Various controller elements may be provided in the core network to provide various control features on the communication devices, some of which will be discussed below in the context of certain examples.

A non-limiting example of communication systems is the long-term evolution (LTE) of the Universal Mobile Telecommunications System (UMTS) that is standardized by the 3rd Generation Partnership Project (3GPP). A LTE base station is known as evolved or enhanced NodeB (eNB) in the vocabulary of the 3GPP specifications. LTE based access systems can employ a mobile architecture known as the Evolved Universal Terrestrial Radio Access Network (E-UTRAN). Other examples of radio services providing a mobile device with access to a communication system include those provided by stations of systems that are based on technologies such as wireless local area network (WLAN) and/or WiMax (Worldwide Interoperability for Microwave Access). WLANs are sometimes referred to by WiFi™, a trademark that is owned by the Wi-Fi Alliance, a trade association promoting Wireless LAN technology and certifying products conforming to certain standards of interoperability.

Figure 2:
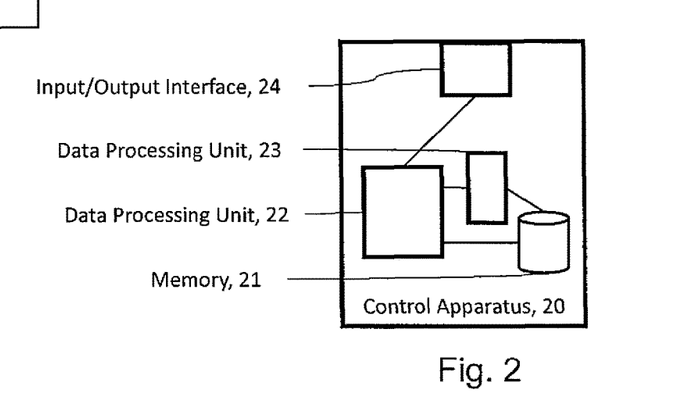
FIG. 2 shows an example of control apparatus.

A communication device is typically controlled by at least one appropriate controller. For example, a base station is provided with controller apparatus so as to enable operation thereof and management of mobile communication devices in communication with the station. The control apparatus can be interconnected with other control entities. FIG. 2 shows an example of a control apparatus for a device, for example to be integrated with, coupled to and/or otherwise for controlling any of base stations, user devices or other devices of FIG. 1. The control apparatus 20 can be configured to provide control functions in association with communication in general, and at least the service discovery aspect in accordance with certain embodiments described below. For this purpose the control apparatus comprises at least one memory 21, at least one data processing unit 22, 23 and an input/output interface 24. Via the interface the control apparatus can be coupled to a receiver and a transmitter of the device or otherwise to other elements of the system. The control apparatus can be configured to execute an appropriate software code to provide the control functions. The data processing, storage and other relevant control apparatus can be provided on an appropriate circuit board and/or in chipsets.

The communication device 1, 2 provides an apparatus that a user can use for communication. Such a communication device is often referred to as user equipment (UE) or terminal. An appropriate mobile communication device may be provided by any device capable of sending and receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia, positioning data, other data, and so on. Users may thus be offered and provided numerous services via their communication devices. Non-limiting examples of these services include two-way or multi-way calls, data communication or multimedia services or simply an access to a data communications network system, such as the Internet. The user may control the operation of the mobile device by means of a suitable user interface such as key pad, voice commands, touch sensitive screen or pad, combinations thereof or the like. A display, a speaker and a microphone are also typically provided. Furthermore, a mobile communication device may comprise appropriate connectors (either wired or wireless) to other devices and/or for connecting external accessories, for example hands-free equipment, thereto. The mobile device may receive and transmit signals via appropriate apparatus for receiving and transmitting signals. The transceiver may be provided for example by means of a radio part and associated antenna arrangement. The antenna arrangement may be arranged internally or externally to the mobile device. A wireless communication device can be provided with a Multiple Input/Multiple Output (MIMO) antenna system.

The dashed oval 16 denotes a single frequency network (SFN) where content can be broadcast to devices in the area thereof. The SFN and operation such as broadcasting and multicasting content in the associated area can be controlled by an appropriate control apparatus 17, for example a multi-cell coordination entity (MCE). For clarity, the control apparatus 17 is shown to be connected to only some of the cells but in practice apparatus 17 would have signaling connection with all relevant base stations.

Cells 8-11 denote schematically cells that are on the border region of the area or SFN 16. Devices in these cells may not be able to adequately receive the broadcast content and/or any control information associated with the broadcasting. For example, another bordering SFN may cause interference, or may otherwise prevent transmission to devices in the bordering region. Thus there can be a region between areas of different multimedia broadcast multicast service single frequency networks (MBSFN) where reception is difficult or even impossible from either SFN due to interference. The size of the SFN areas can be reduced and cells between two adjacent SFN areas using the same frequency can be excluded from the SFNs to avoid interference problems in receiving the SFN signals.

In FIG. 1 the content can be delivered to terminal devices in the actual SFN area or in the associated border region either by unicast or broadcast. A network configuration may be provided where the delivery of a broadcast service, such as digital terrestrial television, is taken care of by dedicated unicast transfer at SFN borders. Thus the area not covered by the SFNs can be served with unicast. Rather than having separate unicast and broadcast networks, in the herein described embodiments the broadcast and unicast can be provided by the same access network(s). An integrated multimedia radio network can thus be configured for the delivery of broadcast service alongside mobile broadband.

Figure 3:
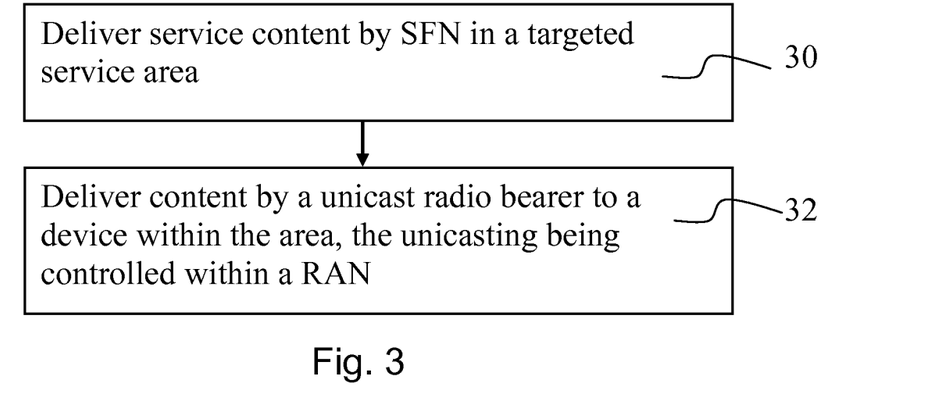
FIGS. 3 to 8 are flowcharts illustrating certain aspects.

FIG. 3 shows a flowchart in accordance with an embodiment for supporting delivery of service content by broadcast and unicast in a cellular system. At 30, a single-frequency network in a targeted service area covering a plurality of cells is used for delivery of service content for devices in the area. Said content is delivered at 32 via dedicated unicasting to at least one device that is within the area but cannot receive the single-frequency network. The dedicated unicasting is controlled at the radio access network level of the cellular system, for example based on signalling between at least one eNB and a user equipment (UE).

Figure 4:
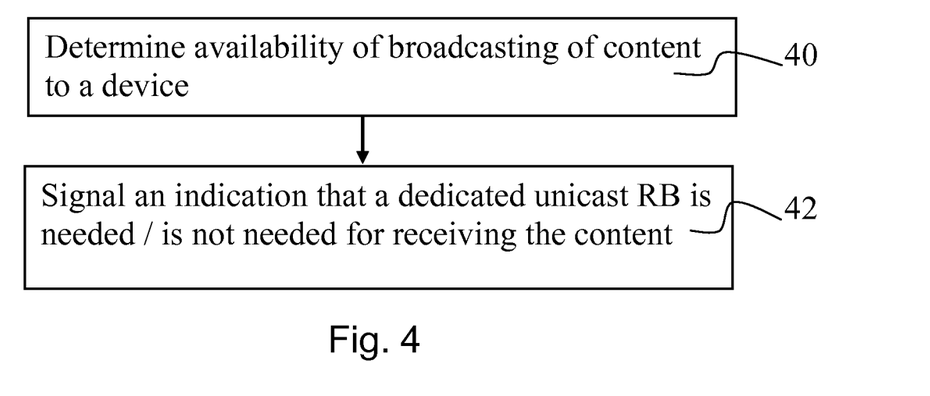

FIG. 4 shows an example for operation at a terminal device that can receive content via the unicasting. The device determines at 40 availability of broadcast transmission of said content. In response to determining whether the broadcasting is available or not, the device can signal at 42 an indication that a dedicated unicast radio bearer is needed/is not needed for reception of said content.

The availability can be determined based on availability of control information supporting reception of the broadcast transmission. The signaling can be triggered in response to determining that a cell broadcasting on a frequency belongs to a service area of the at least one service. Another possibility is to determine whether a cell broadcasting on a frequency does not provide or provides sufficient control information for initiation of reception of broadcast content of the at least one service.

Figure 5:
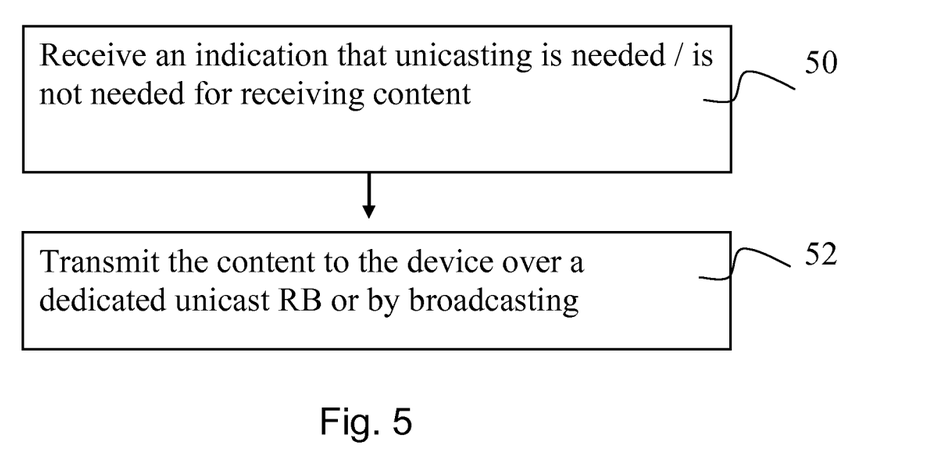

FIG. 5 shows a flowchart for transmitting content of at least one service to a device. At 50 an indication is received from the device that unicasting is needed/not needed for transmission of said content. The content is then transmitted accordingly at 52 to the device over a dedicated unicast radio bearer or broadcasting.

It can be determined if said content is available for the transmission, and a transmission of said content can be initiated after the determination over a dedicated unicast radio bearer.

Figure 6:
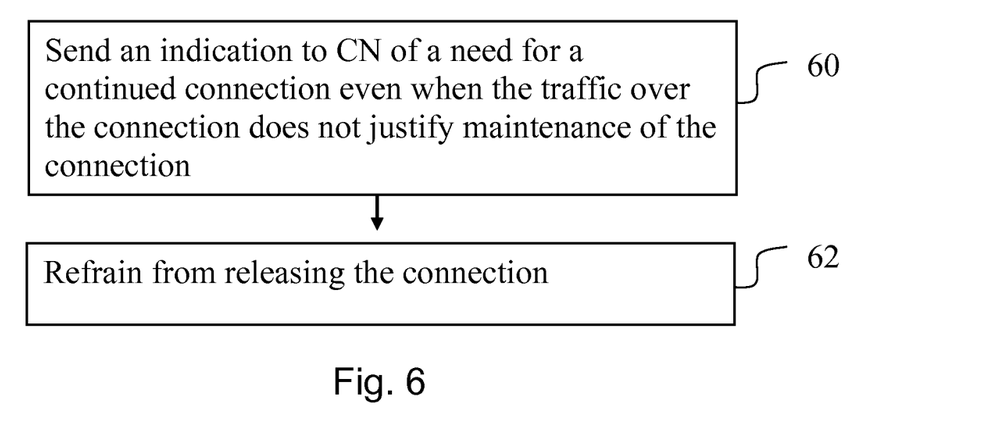

FIG. 6 shows a flowchart for another aspect of supporting transmission of content of at least one service in a system comprising a core network and at least one access network. A device can send at 60 an indication of a need for a continued network connection even when the amount of unicast traffic over the connection in a core network does not justify maintenance of the connection. Said indication can be sent to a core network entity. Upon reception of the indication the core network can refrain at 62 from releasing said network connection when the amount of unicast traffic over said connection in the core network does not justify maintenance of the connection.

Figure 7:
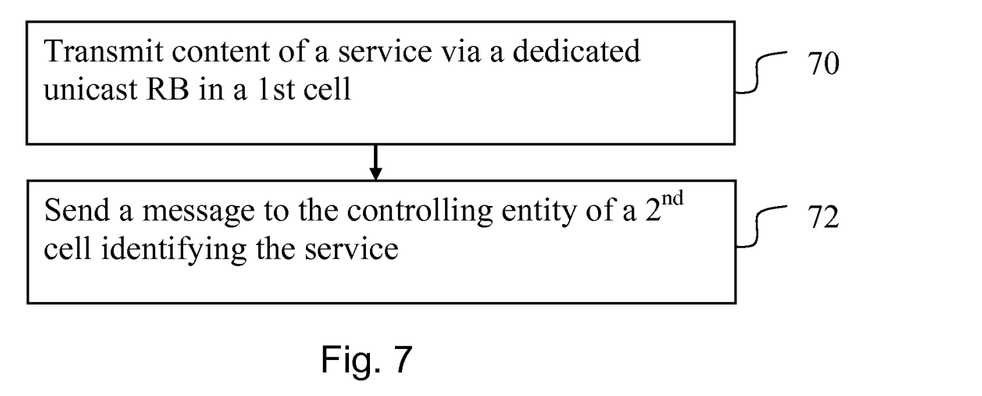

FIG. 7 shows yet another aspect for delivery of content to a device in a cellular system. At 70 content of at least one service is transmitted from a base station under a controlling entity of a first cell to the device over a dedicated unicast radio bearer. At 72 the controlling entity causes sending of a message to a controlling entity of a second cell, the message providing information of the identity of the at least one service. For example, a handover-source eNB can signal this information to a handover-target eNB.

Figure 8:
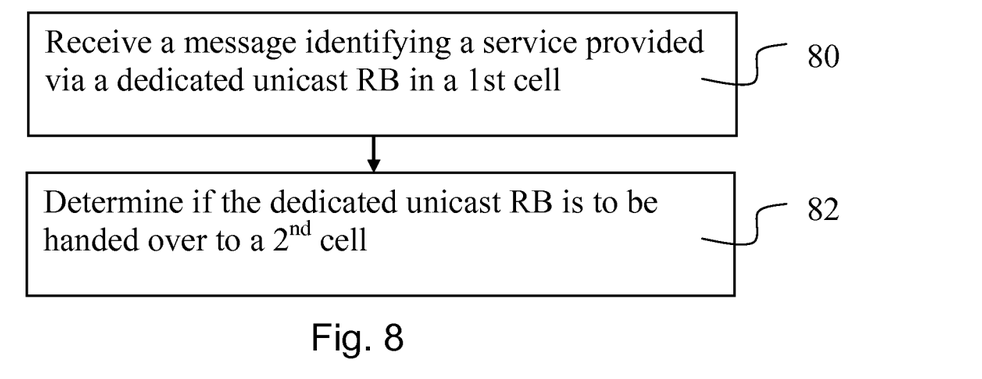

FIG. 8 shows a related operation for continuing transmission of content to a device in a cellular system as it takes place in a network element receiving the device. More particularly, the controlling entity of the second cell receives at 80 the message providing information about at least one service where said content is delivered via the dedicated unicast radio bearer in the first cell. It is determined at 82 whether the dedicated unicast radio bearer is to be handed over to the controlling entity of the second cell based on the information.

Said message may further identify the radio bearer used for said communication of content, and/or at least one packet number of said content successfully delivered to the device.

Control of unicasting at the radio access network level may provide a regional restriction on the dedicated unicasting of said content. For example, a unicasting of a TV or radio program or other regional content such as public announcements can be limited to an area where the transmission is deemed necessary or allowable.

The content transmission on the single-frequency network can be made under control of a network element for controlling broadcast multicast services in a plurality of radio access networks.

Control apparatuses of the cells that are associated with the SFN area may be provided with information regarding the identities of multimedia broadcast multicast services (MBMS) to be delivered. Information of an address where from the content for the services can be obtained may also be provided. The control apparatuses can then grant or deny requests for the dedicated unicasting based on the information.

In accordance with a more detailed example the SFN boundaries can be treated in the following manner to avoid problems at the boundary. Where SFN reception is impossible, a terminal device such as a user equipment (UE) can receive the service over unicast bearer of the cellular network, i.e. data radio bearer (DRB), on radio resources other than those configured for the SFN. The radio resources may be subframes other than MBSFN subframes on a unicast-MBMS shared LTE carrier, or a unicast carrier separate from a dedicated MBMS carrier used for broadcasting the MBSFN.

In accordance with an embodiment the network entity controlling the UE can decide whether unicasting is used or not. The criterion whether to use unicast can be based on information and/or criteria associated with the geographical area. For example, an operator may want a general MBMS service be available everywhere whereas a specific MBMS service may only be accessible in a specific region. The broadcast service could be also otherwise geographically restricted. In certain scenarios the restriction can be applied only when the service reception is otherwise impossible due to radio reasons. Thus, unicasting may be limited only to specific regions where MBSFN reception is not possible.

The entity may determine, upon receiving a request for a unicast radio bearer that a session for the content service is in progress before taking further action. Initiating unicasting may further comprise joining a multicast delivery of said content for said service.

The current service-level mechanisms (e.g. PSS, Packet-switched Streaming Service) are transparent to the radio access network (RAN). This means that a terminal device can access regional content even if the device is not in that region. For example, a device can be granted dedicated unicast delivery of e.g. regional TV programme even in locations outside the actual target region of that program, i.e. outside where the SFN broadcast for that program is set up. This is so because a device may request unicast delivery of regionally restricted content from a core-network entity, e.g. a broadcast-multicast service center (BM-SC), which is not aware of the precise location of the device. This can be so e.g. because such information is only available in the radio access network (RAN). Hence the broadcast-multicast service center (BM-SC) or like element is unable to grant or deny such a request based on the location of the requestor.

The following examples relate to possible mechanisms for limiting delivery of regional content so as to keep it genuinely regional. In accordance with a possibility for restricting delivery of regional content the decision to grant a requested service delivery by unicast can be made in the radio access system, for example by a cell/an eNB. All eNBs/cells that are a part of an MBMS service area where a given MBMS service is to be delivered can receive the MBMS session-start and/or stop signalling. This signalling is received regardless of whether they are configured to participate in a related SFN or not. The eNB can obtain from the signalling the internet protocol (IP) multicast address to subscribe to in order to receive the service content, as well as the ID (e.g. temporary mobile group identity; TMGI) of each MBMS service to be delivered. Based on this the eNB is able to grant or deny a request by a UE for dedicated service delivery over unicast.

Also regardless of whether configured to participate in a related SFN or not, all eNBs that are a part of an MBMS service area can be advertised to be part of the MBMS service area. This advertisement can serve as the authorization for the terminal device to request unicast delivery of the MBMS service if the terminal device does not find the relevant broadcast by multimedia broadcast multicast service (MBMS) single frequency network (MBSFN). The requested service can be provided using unicast for e.g. devices in the border region where it is not possible to achieve the signal reception quality requirement of the MBSFN.

The advertisement may take place for example by means of system information block (SIB) 15 broadcast. In LTE, system information block (SIB) 13 provides control information necessary to receive the MBSFN in participating cells. SIB15, in turn, provides, per carrier frequency of surrounding cells, MBMS service-area identities (SAIs) which the cells on those frequencies have been configured to serve. The terminal device can combine this information with session-description information received on application layer, to determine whether an MBMS service of interest may be broadcast at its present location. Based on this, a device in radio resource control (RRC) Connected state may send an uplink RRC message ('MBMSInterestIndication') to notify the eNB that the terminal device/user equipment (UE) should be configured such that it is able to receive MBMS broadcast from the indicated frequency/ies.

A device in the targeted service area can request for a start or stop of delivery of the content via the dedicated unicasting. A request can be sent e.g. in response to determination that the content cannot be received via broadcasting. In accordance with a possibility a new uplink radio resource control (RRC) message can be defined for the UE to request for a start/stop of unicast delivery of an MBMS service. UEs receiving unicast transmission are in RRC Connected state, and thus enabled for this kind of signalling.

An issue in here is that MBMS data does not reach the eNB over a UE-dedicated connection, and therefore, in accordance with the current practice, the core network might at some point release the connection of the UE due to lack of traffic dedicated to the UE traversing the core network. To prevent this from happening, appropriate signalling can be arranged to inform the relevant core network entities that the UE connection shall not be released. An indication that dedicated unicasting of broadcast-service content is provided at the radio access network level can be signalled to at least one element in the core network of the cellular system. For example, a new value can be added for the service type information element in the extended service request message of the NAS (Non Access Stratum) protocol used on the control plane between the UE and the core network element, e.g. a Mobility Management Entity (MME). The value may be for example an indication like 'local MBMS reception'.

In addition to procedure and signalling for controlling the geographical scope of unicast delivery of a broadcast service, service continuity for terminal mobility within, into and out of SFN-border regions can also be provided. Service continuity can be provided for regional MBMS content delivery via the dedicated unicast or by a specific configuration combining multicast and unicast services transfer at single frequency network (SFN) borders. The following discusses some scenarios that may occur when providing service continuity for mobile users, especially when delivery restrictions are applied.

In accordance with a scenario mobility occurs between cells where SFN reception is impossible, or at least not of adequate quality. In FIG. 1 this could be e.g. device 2 moving from cell 11 to cell 10. If the unicast delivery is fully transparent to E-UTRAN this would entail a regular unicast handover. However, if E-UTRAN is in control of the unicast delivery, the handover can be modified as follows. A target cell can be informed of the identity of a multimedia broadcast multicast service the device moving is receiving and of content delivered for the multimedia broadcast multicast service. The delivery can be continued or discontinued in the target cell depending on whether the identity is recognised by the target cell. The identity may be delivered e.g. in a handover request.

For example, the target cell (10) is informed of the TMGI which a UE is receiving over the unicast connection, to be able to deliver it to the UE, as well as the last SYNC-protocol Packet Number that has been delivered to the UE. Both of these parameters imply new handover-preparation information elements (IEs) into the X2AP and S1AP protocols. If the target cell does not recognize the TMGI, i.e. the target cell is not part of the service area, the UE simply runs out of service as is the intended outcome in this case.

According to another scenario a mobile device can move away from the SFN interior/area where SFN reception works, i.e. from e.g. cell 5 to cells of unacceptable quality for SFN, e.g. cell 10. Cells of unacceptable quality may represent, for example, a certain number of tiers of cells at the edge of the SFN. The device receiving a multimedia broadcast multicast service on the single-frequency network can detect lack of sufficient control information for initiating such reception, and in response thereto, request for dedicated unicasting from the radio access network.

For example, system information communicated to UEs can be used as a basis for this. To provide seamless mobility for the UE, in cells where the SFN reception is expected to shift from acceptable to unacceptable quality, a system information block 15 (SIB15) message can be used to advertise the support of corresponding service area on a certain frequency by the eNB as discussed above. This frequency may be that of the cell broadcasting that SIB15, or another one. In contrast, even though the MBSFN itself may be broadcast by that eNB, SIB13 messaging with its control information for this MBSFN, or more precisely, the MBSFN-area ID for this MBSFN, can be omitted.

At entry to such a cell, the UE can discover that it is "running out" of the SIB13-broadcast for the SFN of interest. In response thereto the UE can decide to request for unicast reception. The lack of the SIB13 information alone means that a UE wishing to start reception in this cell shall request for unicast reception. It is also worth noting that the lack of SIB13 does not as such necessarily interrupt a readily on-going reception of an MBSFN, i.e. a UE entering a cell without SIB13 support for a particular MBSFN may still be able to continue receiving the MBSFN for as long as reception quality allows.

According to a third scenario the mobility is towards the SFN interior, i.e. e.g. from cell 10 to cell 5. Handling of this scenario can be controlled by the E-UTRAN or by the UE. In both these options, a UE receiving an MBMS service over a unicast radio bearer monitors for the appearance of both the MBSFN broadcast of the service of interest as well as the corresponding SIB13 information in its primary cell.

In E-UTRAN controlled case, as a UE moves and changes cells while receiving MBMS over unicast bearer, once it enters a cell that also broadcasts the same service over MBSFN as well as the corresponding SIB13 information, the controlling eNB knows that the dedicated MBMS reception of the UE becomes redundant. Relying on also the UE monitoring for this possibility, the eNB can then stop the MBMS delivery over DRB after a delay within which the UE can be assumed to have changed to the MBSFN reception.

In UE controlled case, if the UE is receiving the MBMS over DRB as an application-layer transaction completely transparent to the eNB, it remains the responsibility of the UE to request the eNB to stop the unicast delivery once the UE enters MBSFN-broadcast coverage.

Thus certain embodiments provide support for service continuity at the UE switching reception between broadcast and unicast. Also, improved control on where terminals can receive restricted content via unicasting may be provided. This may be particularly advantageous in SFN borders. High spectral efficiency can be maintained even though the adjacent SFNs have different content. Controlled use of unicasting in border regions can be used to avoid a need to apply a large reuse factor in delivering the broadcast service throughout the radio network, thus addressing the issue with current dedicated broadcast radio networks undermining their large-scale average spectral efficiency. Instead of network-wide large-factor reuse, redundancy in radio-resource expenditure (either in time in case of unicast-MBMS shared carrier, or in frequency in case of MBMS-dedicated carrier deployed in parallel with pure unicast LTE carrier) is only needed near SFN borders, for the broadcast-service delivery over cellular unicast bearers.

The required data processing apparatus and functions of a base station apparatus, a communication device and any other appropriate station or element may be provided by means of one or more data processors or other means arranged to provide the required functions. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

An appropriately adapted computer program code product or products may be used for implementing the embodiments, when loaded or otherwise provided on an appropriate data processing apparatus, for example for causing determinations when, what and where to communicate and communications of information between the various nodes. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the inventions may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

It is noted that the various examples above can be provided as alternatives or as complementary solutions. Whilst embodiments have been described in relation to communications system such as those based on the LTE systems and 3GPP based systems, similar principles can be applied to other communication systems and channels. For example, the above examples do not exclude the possibility of a combination where the SFN delivery of the broadcast service is realized by a non-LTE radio network such as DVB-T/T2 and only the unicast delivery is realized using a mobile cellular network such as E-UTRAN. Also, the above principles can also be used in networks where relay nodes are employed for relaying transmissions between stations. Therefore, although certain embodiments were described above by way of example with reference to certain exemplifying architectures for wireless networks, technologies and standards, embodiments may be applied to any other suitable forms of communication systems than those illustrated and described herein. It is also noted that different combinations of different embodiments are possible. It is also noted herein that while the above describes exemplifying embodiments of the invention, there are several variations and modifications which may be made to the disclosed solution without departing from the spirit and scope of the present invention.

The invention claimed is:

1. A method comprising:
    receiving content of at least one service at a device of a communication network via a dedicated unicast radio bearer;
    determining, at the device, that a cell broadcasting on a frequency of the communication network provides an availability of control information supporting initiating reception of a broadcast transmission of said content with a sufficient quality and that the cell belongs to a service area of the at least one service; and
    in response to determining that the control information supporting initiating reception of the broadcast transmission is available and that the cell broadcasting on the frequency belongs to the service area of the at least one service;
    transmitting, from the device, via the dedicated unicast radio bearer an indication that the dedicated unicast radio bearer is not needed for reception of said content.

2. The method according to claim 1, wherein determining that the cell broadcasting on the frequency provides sufficient control information for initiation of reception of the broadcast transmission of said content of the at least one service is based on an indication received in a system information block 15 broadcast from the communication network.

3. A method comprising:
    transmitting, by a base station, content of at least one service to a device of a communication network via a dedicated unicast radio bearer;
    receiving, at the base station, from the device via the dedicated unicast radio bearer an indication that indicates that the dedicated unicast radio bearer is not needed and the content via the dedicated unicast radio bearer can be stopped for transmission of said content and that a cell broadcasting on a frequency belongs to a service area of the at least one service, wherein the indication is based on transmission from the base station indicating that initiating a broadcast transmission of the content of the at least one service with a sufficient quality is available; and
    stopping the transmitting of the content via the dedicated unicast radio bearer, wherein based on the stopping the device is able to receive the content of the at least one service via the broadcast transmission.

4. The method according to claim 3, wherein the unicasting is provided at a border region of a single frequency network.

5. The method according to claim 3, comprising signalling information regarding at least one of identities of the at least one service, delivery states of the at least one service and, an address where to obtain the content for the at least one service.

6. The method according to claim 5, comprising granting or denying requests for the unicasting based on the information.

7. The method as claimed in claim 1, wherein a device requests for start of delivery of the content via the unicasting in response to determination that the content cannot be received via broadcasting.

8. The method according to claim 1, wherein frequencies of cells associated with a multimedia broadcasting multicasting services service area are advertised, and reception of the advertisement authorises a device in a cell to request for a dedicated unicast radio bearer for delivery of content of said service.

9. The method according to claim 3, comprising providing a control entity of a target cell with information of the identity of a multimedia broadcast multicast service a device moving from another cell is receiving and of content of the multimedia broadcast multicast service, and causing continuation or discontinuation of delivery of the content by the control entity of the target cell depending on whether the identity is recognised by the control entity of the target cell.

10. The method according to claim 1, comprising determining by a device receiving a multimedia broadcast multicast service on a single-frequency network lack of sufficient control information to initiate such reception, and in response thereto, requesting for a dedicated unicast radio bearer from the radio access network.

11. The method according to claim 1, wherein a device receiving the content over the dedicated unicast radio bearer monitors for broadcasting of the same content and corresponding control information, and upon detection of the broadcasting and the corresponding control information, the device requests for a stop of the unicasting from the cell.

12. The method according to claim 1, comprising determining by a control apparatus of a cell serving a device receiving the content by dedicated unicasting that the dedicated unicasting has become redundant, and in response thereto stopping delivery of the content via the dedicated unicasting.

13. The method according to claim 1, wherein at least one of a service is identified based on a temporary mobile group identity, and need for unicasting is determined based on at least one of system information block or system information block signalling.

14. The method according to claim 3, comprising applying a regional restriction on the unicasting of said content.

15. The method according to claim 3, wherein
the indication causes stopping the receiving of the content via the dedicated unicast radio bearer, and the method further comprising:
based on the stopping, switching, by the device, to receiving the content of the at least one service via the broadcast transmission.

16. An apparatus for supporting content services, the apparatus comprising at least one processor, and at least one memory including computer program code, wherein the at least one memory and the computer program code are configured, with the at least one processor, to cause the apparatus to:
receive content of at least one service at a device of a communication network via a dedicated unicast radio bearer;
determine, at the device, that a cell broadcasting on a frequency provides an availability of control information supporting initiating reception of a broadcast transmission of said content with a sufficient quality and that the cell belongs to a service area of the at least one service, and that the cell belongs to a service area of the at least one service; and
in response to determination that the control information supporting initiating reception of the broadcast transmission is available and that the cell broadcasting on the frequency belongs to the service area of the at least one service;
transmit, from the device, via the dedicated unicast radio bearer an indication that the dedicated unicast radio bearer is no longer needed for reception of said content.

17. A computer program product comprising a non-transitory computer-readable medium comprising computer-readable code, which when the computer-readable code is run on a processor, causes an apparatus to perform the method of claim 1.

18. An apparatus for supporting content services, the apparatus comprising at least one processor, and at least one memory including computer program code, wherein the at least one memory and the computer program code are configured, with the at least one processor, to cause the apparatus to:
transmit, by a base station, content of at least one service to a device via a dedicated unicast radio bearer;
receive, at the base station, from the device via the dedicated unicast radio bearer an indication that indicates that unicasting is not needed and the content via the dedicated unicast radio bearer can be stopped for transmission of said content and that a cell broadcasting on a frequency belongs to a service area of the at least one service, wherein the indication is based on transmission from the base station indicating that initiating a broadcast transmission of the content of the at least one service with a sufficient quality is available; and
stop the transmission of the content to the device via the dedicated unicast radio bearer based at least in part on the indication.

19. A computer program product comprising a non-transitory computer-readable medium comprising computer-readable code, which when the computer-readable code is run on a processor, causes an apparatus to perform the method of claim 3.

20. A method as in claim 1, wherein the indication causes stopping the receiving of the content via the dedicated unicast radio bearer, and based on the stopping, switching, by the device, to receiving the content of the at least one service via the broadcast transmission, and wherein during the switching the device receives the same content via the dedicated unicast radio bearer and via the broadcast transmission.

* * * * *